(12) United States Patent
Olhagaray et al.

(10) Patent No.: US 12,030,267 B2
(45) Date of Patent: Jul. 9, 2024

(54) CURING MOLD FOR MANUFACTURING A TURBOMACHINE COMPONENT MADE OF COMPOSITE MATERIAL FROM A PREFORM AND METHOD FOR MANUFACTURING A COMPONENT BY MEANS OF SUCH A MOLD

(71) Applicant: SAFRAN, Paris (FR)

(72) Inventors: Jérôme Olhagaray, Moissy-Cramayel (FR); Thierry Patrick Chauvin, Moissy-Cramayel (FR); Kris Hoes, Moissy-Cramayel (FR); Michel Wlasow Wlasowski, Moissy-Cramayel (FR)

(73) Assignee: SAFRAN, Paris (FR)

( * ) Notice: Subject to any disclaimer, the term of this patent is extended or adjusted under 35 U.S.C. 154(b) by 133 days.

(21) Appl. No.: 17/413,274

(22) PCT Filed: Dec. 10, 2019

(86) PCT No.: PCT/FR2019/053002
§ 371 (c)(1),
(2) Date: Jun. 11, 2021

(87) PCT Pub. No.: WO2020/120896
PCT Pub. Date: Jun. 18, 2020

(65) Prior Publication Data
US 2022/0016812 A1    Jan. 20, 2022

(30) Foreign Application Priority Data
Dec. 14, 2018   (FR) ...................... 1872924

(51) Int. Cl.
*B29C 70/44* (2006.01)
*B29C 43/36* (2006.01)
(Continued)

(52) U.S. Cl.
CPC .......... *B29C 70/546* (2013.01); *B29C 43/361* (2013.01); *B29C 43/3642* (2013.01);
(Continued)

(58) Field of Classification Search
CPC .......... B29C 70/546; B29C 2043/3649; B29C 43/10; B29C 70/302; B29C 70/461; B29C 70/541; B29C 70/44; B29C 70/46
See application file for complete search history.

(56) References Cited

U.S. PATENT DOCUMENTS 3,614,811 A * 10/1971 Johnson ................. B29C 51/28
425/389
4,148,597 A * 4/1979 Larsen ............... B29D 99/0003
425/389

(Continued)

FOREIGN PATENT DOCUMENTS

EP    2623302 A1 * 8/2013 ............ B29C 70/44
FR    3059266 A1    6/2018
JP    2007253441 A   10/2007

OTHER PUBLICATIONS

Search Report issued in French Patent Application No. 1872924 dated Sep. 25, 2019.
(Continued)

*Primary Examiner* — Matthew J Daniels
(74) *Attorney, Agent, or Firm* — Pearne & Gordon LLP

(57) ABSTRACT

A curing mold for manufacturing a turbomachine part made of composite material from a preform produced by draping pre-impregnated materials includes: a first body and a second body designed to be attached to each other and jointly defining a fixed air gap for receiving the preform and itself including a molding part of complementary shape with the part to be manufactured and intended to receive a portion to be molded of the preform, and at least one additional part located in a peripheral space of the air gap and intended to receive an additional portion forming an edge of the preform; a heating member designed to heat the preform in the air gap to a first temperature; at least one inflatable bladder housed in the first or second body, facing an additional part of the air gap; a member for injecting a pressurized fluid inside the bladder(s).

11 Claims, 5 Drawing Sheets

(51) Int. Cl.
    *B29C 43/52*     (2006.01)
    *B29C 70/46*     (2006.01)
    *B29C 70/54*     (2006.01)
    *B29K 105/08*     (2006.01)
    *B29L 31/00*     (2006.01)
    *B29L 31/30*     (2006.01)

(52) U.S. Cl.
    CPC ............ *B29C 43/52* (2013.01); *B29C 70/446* (2013.01); *B29C 70/46* (2013.01); *B29C 70/462* (2013.01); *B29C 2043/3613* (2013.01); *B29C 2043/3649* (2013.01); *B29C 2043/525* (2013.01); *B29K 2105/0872* (2013.01); *B29L 2031/30* (2013.01); *B29L 2031/7504* (2013.01)

(56) References Cited

U.S. PATENT DOCUMENTS

| | | | | |
|---|---|---|---|---|
| 4,695,344 A * | 9/1987 | Crane | ..................... | B29C 70/44 |
| | | | | 156/289 |
| 4,873,044 A * | 10/1989 | Epel | ........................ | B29C 70/48 |
| | | | | 425/389 |
| 5,108,532 A * | 4/1992 | Thein | .................. | B32B 37/1009 |
| | | | | 156/308.2 |
| 5,145,621 A * | 9/1992 | Pratt | ....................... | B29C 33/30 |
| | | | | 264/102 |
| 5,372,491 A * | 12/1994 | Fritsch | ................ | B29C 45/1639 |
| | | | | 425/417 |
| 5,427,518 A * | 6/1995 | Morizot | .................. | B29C 70/38 |
| | | | | 100/211 |
| 5,648,109 A * | 7/1997 | Gutowski | ................. | B30B 5/02 |
| | | | | 425/389 |
| 6,919,039 B2 * | 7/2005 | Lang | ....................... | B29C 43/12 |
| | | | | 425/389 |
| 9,421,717 B2 * | 8/2016 | Aravamudan | ........... | B29C 39/42 |
| 2003/0059490 A1 * | 3/2003 | Moore, Jr. | .............. | B29C 43/10 |
| | | | | 425/389 |
| 2014/0103585 A1 | 4/2014 | Coxon et al. | | |
| 2016/0059500 A1 * | 3/2016 | Hosokawa | ............. | B29C 70/48 |
| | | | | 425/521 |
| 2018/0257314 A1 * | 9/2018 | Destories | .............. | B29C 33/505 |

OTHER PUBLICATIONS

International Search Report issued in Application No. PCT/FR2019/053002 dated Mar. 18, 2020.
Written Opinion for PCT/FR2019/053002 dated Mar. 18, 2020.

* cited by examiner

CURING MOLD FOR MANUFACTURING A TURBOMACHINE COMPONENT MADE OF COMPOSITE MATERIAL FROM A PREFORM AND METHOD FOR MANUFACTURING A COMPONENT BY MEANS OF SUCH A MOLD

This is the National Stage of PCT international application PCT/FR2019/053002, filed on Dec. 10, 2019 entitled "CURING MOLD FOR MANUFACTURING A TURBOMACHINE COMPONENT MADE OF COMPOSITE MATERIAL FROM A PREFORM AND METHOD FOR MANUFACTURING A COMPONENT BY MEANS OF SUCH A MOLD", which claims the priority of French Patent Application No. 1872924 filed Dec. 14, 2018, both of which are incorporated herein by reference in their entirety.

TECHNICAL DOMAIN

The invention relates to a curing mold for manufacturing a turbomachine component made of a composite material from a preform, a method for manufacturing a turbomachine component made of a composite material by means of such a mold and a turbomachine component made of a composite material obtained by application of such a method.

STATE OF PRIOR ART

There are several known methods for manufacturing turbomachine components made of a composite material.

For example, it is known that a preform of the turbomachine component can be made by laying up from prepregs, then curing this preform to obtain the turbomachine component.

In this description, "prepreg" means a semi-finished product comprising reinforcing fibers and a thermosetting resin (matrix) in which the reinforcing fibers are impregnated. Such prepregs are usually packaged in the form of rolls of fiber mats, single-directional and continuous, impregnated with the thermosetting resin.

For example, prepregs are laid up by automated placement of fibers, also known as "AFP" for "Automated Fiber Placement", which is a laying up technique particularly suited for turbomachine components with complex geometry, especially with double curvature.

To achieve this, a robotic fiber placement head cuts strips from a prepreg mat, and then places these strips on the surface of a curing mold with a shape complementary to a surface of the turbomachine component to be manufactured. Several prepreg strips can be stacked on top of each other, in particular with different orientations of reinforcing fibers, but the reinforcing fibers remain perpendicular to the stacking direction of the prepregs.

The preform thus made is then positioned on the surface of a curing mold with a shape complementary to a surface of the turbomachine component to be manufactured, it is then covered with a membrane and placed in an autoclave in which the membrane is placed under a vacuum. In the autoclave, the preform is cured under controlled temperature and pressure conditions, so as to polymerize the resin and therefore consolidate the preform, and thus obtain the turbomachine component.

It is generally recognized that, due to controlled temperature and pressure conditions, curing the preform in an autoclave can be used to obtain turbomachine components made of a composite material with high mechanical performances.

However, when the turbomachine component to be manufactured has tight tolerance ranges for the geometry, as is the case for example with the external casings of the low-pressure compressor for a twin-spool turbomachine, the preform cannot be cured in an autoclave, since the membrane under a vacuum and the pressure inside the autoclave make it impossible to respect such tolerance ranges for the geometry of the turbomachine component to be manufactured.

Alternatively, after the prepregs have been laid up, the preform can for example be molded by transferring the same qualified resin. This molding technique is known as "SQRTM" for "Same Qualified Resin Transfer Molding".

This molding technique uses a curing mold comprising a first and a second body, the internal surfaces of which together define a fixed air gap with a shape complementary to the turbomachine component to be manufactured, a component to create a vacuum in the air gap, and a piston to inject resin in channels that are formed in the first and second bodies and that communicate with the air gap.

When the preform is being molded, the preform is placed in the air gap of the curing mold between the first and second bodies, so that empty spaces are left in the air gap along the free edges of the preform with which the channels communicate. The first and second bodies are then clamped against each other, for example by means of a press, and a vacuum is then created in the air gap. The curing mold is heated, for example by means of the press, while the resin, identical to the resin in prepregs forming the preform, is injected into the channels so as to fill the empty spaces in the air gap along the free edges of the preform with resin, and thus put the preform under hydrostatic pressure in the air gap. This hydrostatic pressure is maintained during curing of the preform, which is thus made under controlled temperature and pressure conditions.

SQRTM can thus be used not only to obtain turbomachine parts with high mechanical performance due to curing of the preform under controlled temperature and pressure conditions, but also to maintain tight tolerance ranges for their geometry due to the curing mold with a fixed air gap. The use of resin identical to the resin used for the prepregs forming the preform also makes it possible to use SQRTM in the aeronautics field, without the need to obtain a new qualification for the resin.

However, SQRTM has the disadvantage that additional resin is required to apply hydrostatic pressure to the preform in the air gap, without this additional resin being retained after the turbomachine component has been manufactured, since the edge of the preform is removed after stripping of the mold. Therefore there is a loss of consumables, generating a significant additional cost for manufacturing of turbomachine parts.

PRESENTATION OF THE INVENTION

The purpose of this invention is to overcome the disadvantages mentioned above, in particular by disclosing a curing mold for manufacturing a turbomachine component made of composite material, from a preform made by laying up prepregs, inside which one or more inflatable bladders are provided to compress one or more edges of the preform by inflation, so as to flush the previously heated resin from the edge(s) of the preform and thus apply hydrostatic pressure to the preform.

More specifically, the subject of the invention is a curing mold for manufacturing a turbomachine component made of a composite material, starting from a preform made by laying up prepregs comprising reinforcing fibers impregnated in a thermosetting resin, the preform having a portion to be molded and at least one additional portion extending into the prolongation of the portion to be molded and forming an edge of the preform, the curing mold comprising:
- a first body and a second body designed to be fitted together, the first and second bodies each comprising an internal surface itself comprising a peripheral area at which the first and second bodies are in contact with each other and a central area defining a fixed air gap between the first and second bodies, the air gap being intended to accommodate the preform and itself comprising:
  - a molding part with a shape complementary to the turbomachine component to be manufactured, the molding part being intended to accommodate the portion to be molded of the preform, and
  - at least one additional part located in a peripheral space of the air gap, the or each additional part being intended to accommodate an additional portion of the preform;
- a heating member designed to heat the preform in the air gap to a first temperature, so as to reduce the viscosity of the resin;
- at least one inflatable bladder housed in the central area of the internal surface of the first or second body, facing an additional part of the air gap;
- an injection member designed to inject fluid under pressure inside the bladder(s), so as to inflate the bladder(s) from a deflated state to an inflated state, and the or each bladder also being designed so that, in the inflated state, it compresses the additional portion of the preform located in the additional part of the air gap facing said bladder, so as to flush the resin from the additional portion of the preform towards the portion to be molded of the preform and thus put the preform under hydrostatic pressure, when the preform is located in the air gap and the heating member heats the preform to the first temperature.

According to variant embodiments that can be taken together or separately:
- the reinforcing fibers of the preform are oriented perpendicular to a stacking direction;
- the bladder(s) is (are) located in the central area of the internal surface of the first or second body, locally in alignment with the additional portion of the preform along the stacking direction of said additional portion, when the preform is located in the air gap of the curing mold;
- the injection member comprises a compressor designed to pressurize the fluid to be injected into the or each bladder and an injection conduit in communication, on the one hand, with the compressor and on the other hand, with the or each bladder, via one or more channels formed in the first and/or second body;
- the fluid injected into the or each bladder is a heat transporting fluid;
- the injection member comprises a heat exchanger designed to heat the heat transporting fluid to be injected into the or each bladder;
- the heating member is designed to heat the preform to a second temperature, higher than the first temperature, in order to cure the preform;
- the or each bladder is designed so that, in the inflated state, the compression applied on the additional portion of the preform located in the additional part of the air gap facing said bladder is maintained when the preform is located in the air gap and the heating member heats the preform to the second temperature.

Another purpose of the invention is a method of manufacturing a turbomachine component made of a composite material, making use of the curing mold as described above, starting from a preform made by laying up prepregs comprising reinforcing fibers impregnated in a thermosetting resin, the preform having a portion to be molded and at least one additional portion extending into the prolongation of the portion to be molded and forming an edge of the preform, the method comprising the following steps:
- place the preform in the air gap, between the first and second bodies of the curing mold, the portion to be molded of the preform being located in the molding part of the air gap, an additional portion of the preform being located in the or each additional part of the air gap;
- heat the preform to the first temperature;
- inject pressurized fluid into the or each bladder, so that the or each bladder is inflated to the inflated state and compresses the additional portion of the preform located in the additional part of the air gap facing said bladder, the preform being maintained at the first temperature, the or each bladder flushing resin from the additional portion of the preform to the portion to be molded of the preform, thus putting the preform under hydrostatic pressure.

According to variant embodiments that can be taken together or separately:
- the manufacturing method includes a subsequent step to heat the preform to a second temperature, higher than the first temperature, in order to cure the preform and thus obtain the turbomachine component, the compression applied by the bladder(s) in the inflated state on the additional portion(s) of the preform being continued;
- the manufacturing method includes the following subsequent steps:
  - release the compression applied by the bladder(s) on the additional portion(s) of the preform thus cured;
  - unmould the preform thus cured;
  - remove the additional portion(s) of the preform thus cured and demoulded, so as to obtain the turbomachine component;
- for example, a hydrostatic pressure between 3 and 10 bar inclusive, preferably between 3 and 7 bar inclusive, is applied to the preform during the step to inject pressurized fluid into the or each bladder;
- the reinforcing fibers of the preform are oriented perpendicular to a stacking direction;
- the bladder(s) is (are) located in the central area of the internal surface of the first or second body, in alignment with the additional portion of the preform along the stacking direction of said additional portion, when the preform is located in the air gap of the curing mold;
- the fluid injected into the or each bladder is a heat transporting fluid and the injection member comprises a heat exchanger designed to heat the heat transporting fluid to be injected into the or each bladder.

BRIEF DESCRIPTION OF THE DRAWINGS

Other aspects, purposes, advantages and characteristics of the invention will become clear after reading the following detailed description of preferred embodiments of the invention, given as non-limitative examples, with reference to the appended drawings among which.

DETAILED DESCRIPTION

FIGS. 1 to 4 show a curing mold 10 for manufacturing a turbomachine component made of composite material, from a preform 200, according to one embodiment of the invention.

The preform 200 is made by laying up prepregs comprising reinforcing fibers impregnated in a thermosetting resin.

For example, the preform 200 is made by laying up prepregs comprising single-directional carbon fibers impregnated with an epoxy thermosetting resin. These prepregs may for example comprise 34% by mass of epoxy thermosetting resin. In the remainder of the description, the values provided are adapted in particular to a preform 200 made by laying up such prepregs.

For example, the preform 200 is produced by automated placement of fibers, also known as "AFP", which stands for "Automated Fiber Placement". As a variant, the preform 200 can be made by manual or automated laying up by placement of tape, also known as "ATL", which stands for "Automated Tape Laying". These laying up techniques are well known to a person skilled in the art.

Reinforcing fibers for the preform 200 are oriented perpendicular to a stacking direction DE that defines a thickness of the preform 200. The reinforcing fibers are thus stacked along the stacking direction DE. It will be understood that, depending on the geometry of the preform 200, particularly its curvature(s), the stacking direction DE of the reinforcing fibers of the preform 200 may have an orientation that varies from one area of the preform 200 to another.

The preform 200 has a portion to be molded 201 and at least one additional portion 202 extending along the prolongation of the portion to be molded 201 and forming an edge of the preform 200. Therefore the portion to be molded 201 and the or each additional portion 202 are made from a single piece. In addition, each has reinforcing fibers impregnated with the resin.

For example, the or each edge of the preform 200 forms an additional portion 202.

In the example shown in FIGS. 1 to 4, the preform 200 has the shape of a rectangular plate and comprises a single additional portion 202 that forms an edge in the shape of a rectangle surrounding the portion to be molded 201. In one variant (not shown), the preform 200 is in the form of a shell.

Figure 1:
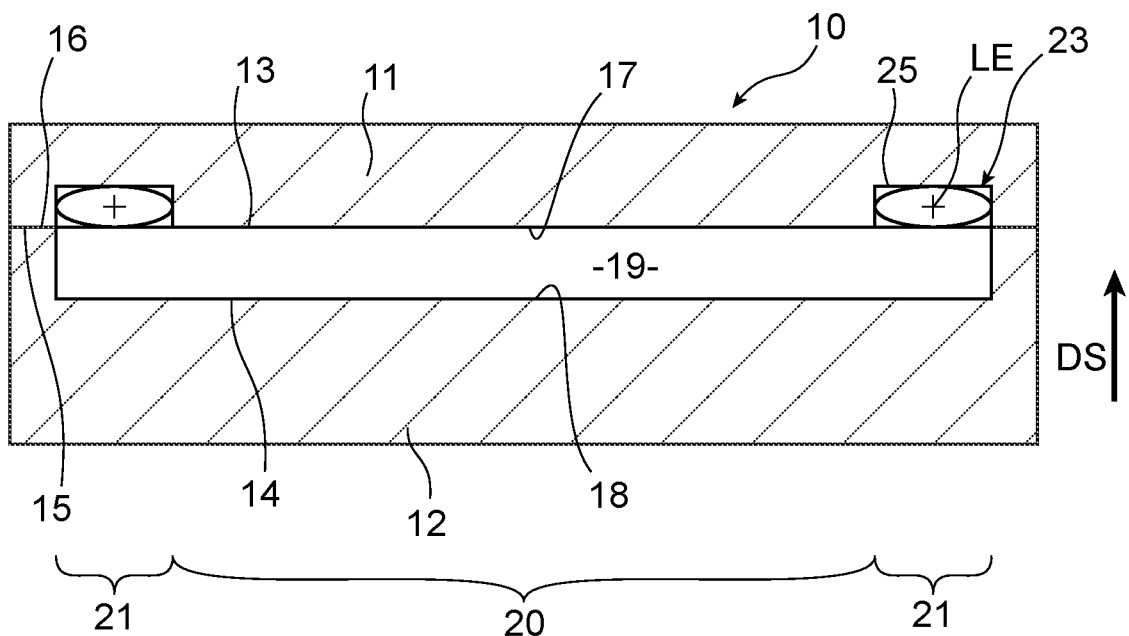
FIG. 1 is a diagrammatic sectional view of a curing mold to manufacture a turbomachine component made of a composite material, from a preform, according to one embodiment of the invention, the curing mold being represented without the preform and with a bladder in the deflated state.

The curing mold 10 comprises a first body 11 and a second body 12 designed to be fitted together. Each of the first and second bodies 11, 12 has an internal surface 13, 14 itself comprising a peripheral area 15, 16 in which the first and second bodies 11, 12 are in contact with each other in a clamping direction DS, for example vertical, and a central area 17, 18. The central areas 17, 18 of the internal surface 13, 14 of the first and second bodies 11, 12 define or jointly delimit a fixed air gap 19 that will accommodate the preform 200 (FIG. 1).

The air gap 19 itself comprises a molding part 20 and at least one additional part 21.

The shape of the molding part 20 of the air gap 19 is complementary to the turbomachine component to be manufactured. The molding part 20 is also intended to accommodate the portion to be molded 201 of the preform 200.

The additional part(s) 21 of the air gap 19 is (are) located in a peripheral space of the air gap 19. "Peripheral space" means a space in the air gap 19 extending along the peripheral areas 15, 16 of the internal surfaces 13, 14 of the first and second bodies 11, 12. The or each additional part 21 of the air gap 19 is also intended to accommodate an additional portion 202 of the preform 200.

In the example illustrated in FIGS. 1 to 4, the air gap 19 comprises a single additional part 21 that forms a rectangular frame surrounding the molding part 20.

Figure 4:
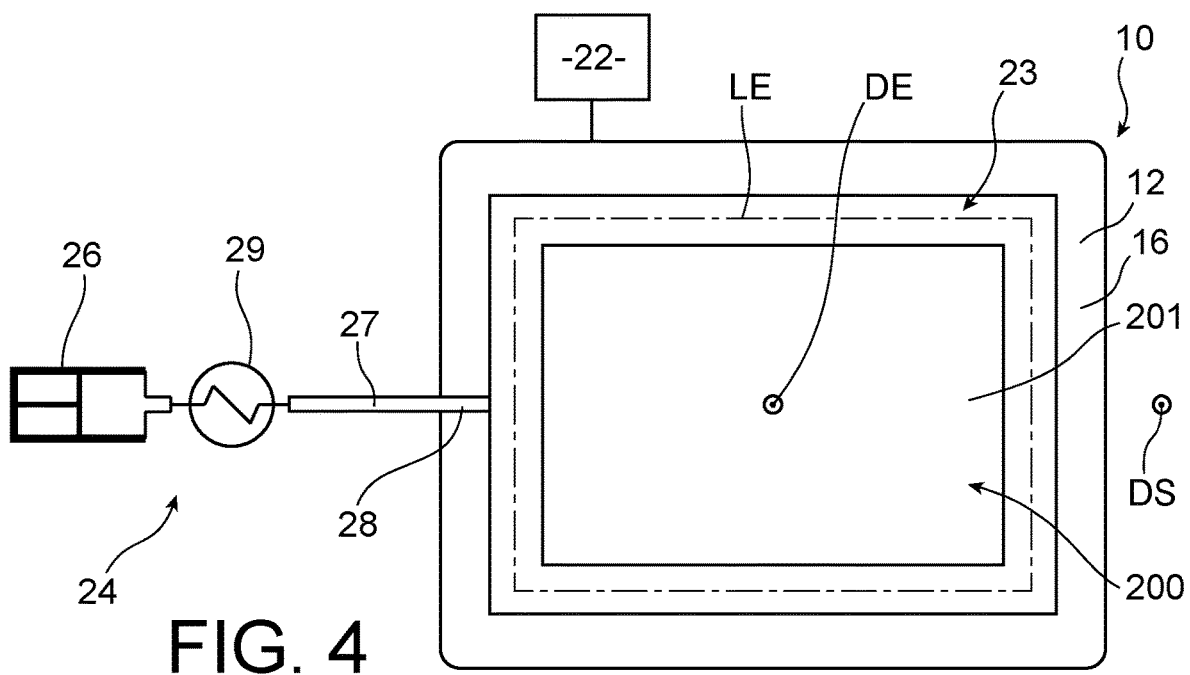
FIG. 4 is a partial top view of the curing mold illustrated in FIGS. 1 to 3.

The curing mold 10 also comprises a heating member 22 designed to heat the preform 200 in the air gap 19 to a first temperature, so as to reduce the viscosity of the resin (FIG. 4). For example, this makes it possible for the resin of the preform 200 to be distributed uniformly in the air gap 19 of the curing mold 10.

For example, the first temperature is between 80 and 110° C. inclusive. For example, the first temperature is held for a duration between 30 and 60 minutes inclusive. This time corresponds particularly to a temperature homogenization plateau of the curing mold 10.

Figure 2:
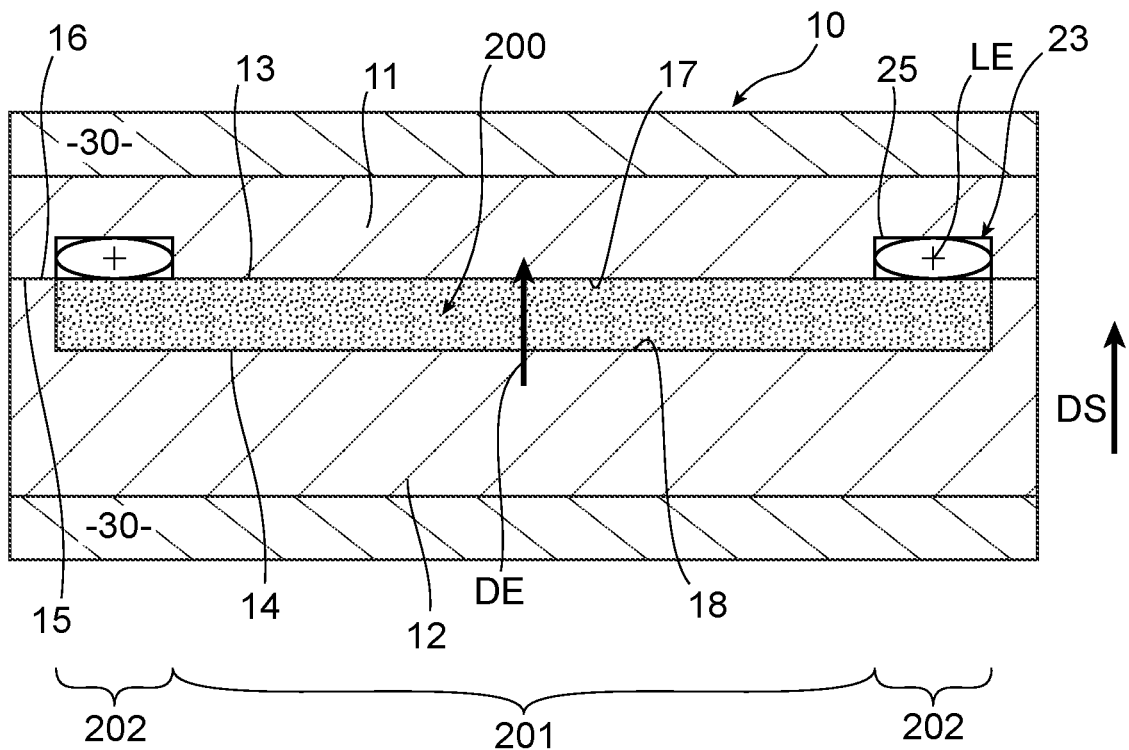
FIG. 2 is a sectional view of the curing mold illustrated in FIG. 1, the preform being located inside the curing mold and the bladder being in the deflated state.
Figure 3:
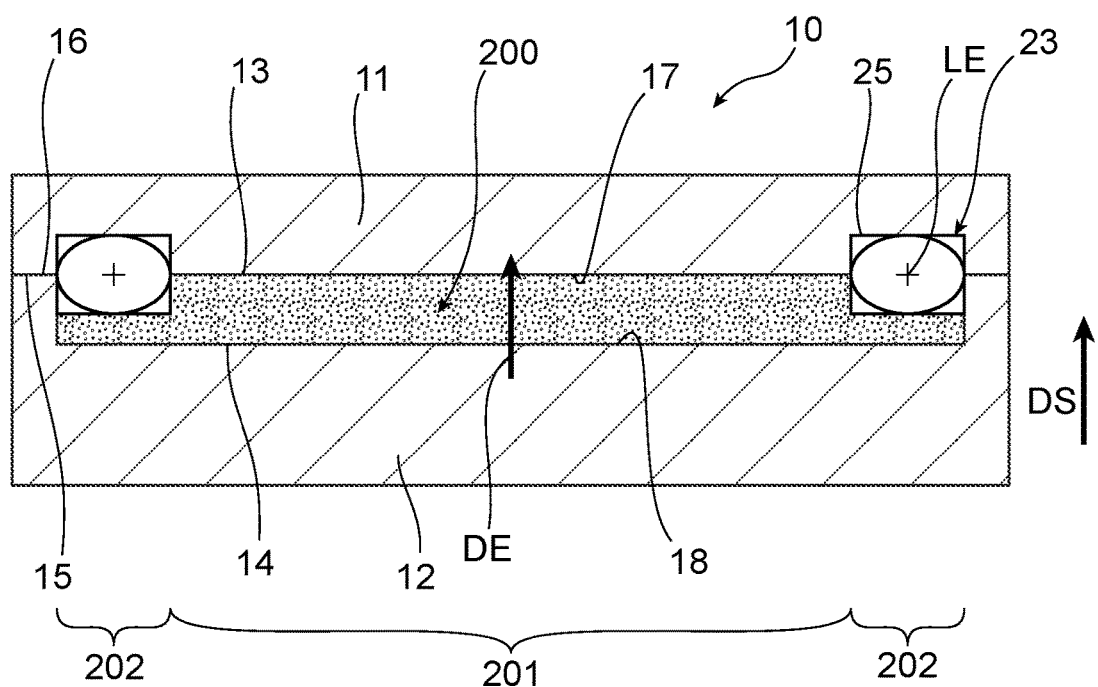
FIG. 3 is a sectional view of the curing mold illustrated in FIGS. 1 and 2, the preform being located inside the curing mold and the bladder being in the inflated state.

The curing mold 10 also comprises at least one inflatable bladder 23 housed in the central area 17, 18 of the internal surface 13, 14 of the first or second body 11, 12, facing an additional part 21 of the air gap 19, and a fluid injection member 24 designed to inject fluid under pressure inside the bladder(s) 23, so as to inflate the bladder(s) 23 from a deflated state to an inflated state (FIGS. 2 to 4).

In addition, the or each bladder 23 is designed so that, in the inflated state, it compresses the additional portion 202 of the preform 200 that is located in the additional part 21 of the air gap 19 facing said bladder 23, in order to flush the resin from the additional portion 202 of the preform 200 into the portion to be molded 201 of the preform 200 and thus apply hydrostatic pressure to the preform 200, when the preform 200 is located in the air gap 19 and the heating member 22 heats the preform 200 to the first temperature (FIG. 3). For example, a hydrostatic pressure of between 3 and 10 bar inclusive, preferably between 3 and 7 bar inclusive, is applied to the preform 200.

"Fluid under pressure" means that the fluid injected into the bladder(s) is at a pressure such that it causes inflation of the bladder(s) 23 in the air gap 19 and compression of the additional portion(s) 202 by the bladder(s) (23).

Thus, the curing mold 10 uses the resin of the additional portion(s) 202 of the preform 200 to apply hydrostatic pressure to the preform 200. Since this or these additional portion(s) 202 is (are) intended to be removed in any case after demoulding when the preform 200 is being made, there is no loss of resin beyond what is already contained in the additional portion(s) 202. The curing mold 10 thus avoids a significant additional cost that would be related to an additional supply of resin to apply hydrostatic pressure to the preform 200. Moreover, since this or these additional portion(s) 202 is (are) removed after demoulding, it is not problematic to dry the resin from this or these additional portion(s) 202 of the preform 200.

For example, the heating member 22 is also designed to heat the preform 200 to a second temperature, higher than the first temperature, so as to cure the preform 200, when said preform 200 is located in the air gap 19. Curing the preform 200 polymerizes the resin in the preform 200 and therefore consolidates it so as to obtain the turbomachine component. The second temperature corresponds in particular to a polymerization temperature of the resin of the preform 200. For example, the second temperature is between 170 and 190° C. inclusive, and particularly equal to 180° C. For example, the second temperature is held for a period equal to 2 h.

The or each bladder 23 may then be designed so that, in the inflated state, the compression exerted on the additional portion 202 of the preform 200 located in the additional part 21 of the air gap 19 facing said bladder 23 is maintained when the preform 200 is located in the air gap 19 and the heating member 22 heats the preform 200 to the second temperature. The preform 200 is thus cured under controlled temperature and pressure conditions, so that a turbomachine component with high mechanical performances can be obtained. The compression applied on the additional portion 202 of the preform 200 by the or each bladder 23 is, for example, held during curing. As a variant, it is modified for and/or during curing.

For example, the heating member 22 is designed to heat the preform 200 through the first and second bodies 11, 12 of the curing mold 10, when the preform 200 is located in the air gap 19 (FIG. 4). For example, the heating member 22 comprises a press like that described below, a heating system using a heat transporting fluid such as oil, or one or more heating cartridges integrated into the first and second bodies 11, 12 of the curing mold 10.

The or each bladder 23 extends along an extension line LE that can be closed or open.

In the example shown in FIGS. 1 to 4, the extension line LE of the bladder 23 is closed and forms a rectangle.

For example, the cross-section of the or each bladder 23 perpendicular to the extension line LE, is rectangular in the inflated state and in the deflated state (FIGS. 1 to 3).

For example, the or each bladder 23 comprises an expandable membrane forming a pouch containing the fluid under pressure injected by the injection member 24. For example, the membrane of the or each bladder 23 is made from silicone.

For example, the curing mold 10 comprises one or more bladders 23 located in the central area 17 of the internal surface 13 of the first body 11, facing the or an additional part 21 of the air gap 19. The bladder(s) 23 is (are) also designed so that, in the inflated state, they compress the additional portion 202 of the preform 200 located in said additional part 21 of the air gap 19, in contact with the central area 18 of the internal surface 14 of the second body 12, when the preform 200 is located in the air gap 19. The additional portion(s) 202 of the preform 200 is (are) then clamped between a bladder 23 and the central area 18 of the internal surface 14 of the second body 12, that is opposite the bladder 23 with respect to the preform 200 (FIG. 3).

In addition or as a variant, the curing mold 10 comprises at least one pair of bladders 23, with a first bladder 23 of the pair being housed in the central area 17 of the internal surface 13 of the first body 11, facing the or an additional part 21 of the air gap 19, and a second bladder 23 of the pair being housed in the central area 18 of the internal surface 14 of the second body 12, facing said additional part 21 of the air gap 19 and the first bladder 23. The first and second bladders 23 are then facing each other so as to clamp the additional portion(s) 202 of the preform 200 between said first and second bladders 23, when the preform 200 is located in the air gap 19.

For example, the or each bladder 23 is designed so that, in the inflated state, it compresses the or an additional portion 202 of the preform 200 located in the additional part 21 of the air gap 19, facing said bladder 23, substantially perpendicular to the orientation of the reinforcing fibers of said additional portion 202, when the preform 200 is located in the air gap 19. The or each bladder 23 thus compresses the additional portion 202 of the preform 200 associated with them, along the stacking direction DE of said additional portion 202 (FIG. 3). This helps to avoid damage to the portion to be molded 201 of the preform 200.

To achieve this, the or each bladder 23 is, for example, housed in the central area 17, 18 of the internal surface 13, 14 of the first or second body 11, 12, in alignment with the additional portion 202 of the preform 200, located in the additional part 21 of the air gap 19 facing said bladder 23, along the stacking direction DE of said additional portion 202, when the preform 200 is located in the air gap 19.

The curing mold 10 comprises, for example, at least one groove 25 formed in the central area 17, 18 of the internal surface 13, 14 of the first or second body 11, 12 and accommodating the or one of the bladders 23. The shape of the groove(s) 25 is also complementary to the bladder(s) (23) when the bladder(s) 23 is (are) in the deflated state.

For example, a fastening system (not shown) is provided for securing the bladder(s) 23 in the groove(s) 25. The attachment system may comprise a frame or several portions of a frame that are accommodated in the or each groove 25 and that are designed to clamp or to compress the edges of the bladder(s) 23 in the groove(s) 25.

The fluid injected inside the bladder 23 comprises, for example, air, oil, etc.

The fluid injected inside the bladder 23 is, for example, a heat transporting fluid, such as oil, so that it contributes to heating the preform 200, to supplement the heating member 22. "Heat transporting fluid" means a fluid capable of transporting and evacuating heat.

The injection member 24 comprises, for example, a compressor 26 designed to pressurize the fluid to be injected into the or each bladder 23 and an injection conduit 27 in communication, on the one hand, with the compressor 26 and on the other hand, with the or each bladder 23, via one or more channels 28 formed in the first and/or second body 11, 12 (FIG. 4).

The injection member 24 may also comprise a heat exchanger 29 designed to heat the heat transporting fluid to be injected into the or each bladder 23 (FIG. 4). For example, the heat exchanger 29 is located between the compressor 26 and the channel(s) 28 communicating with the bladder(s) 23. The heat transporting fluid thus heats the first and/or second body 11, 12, via the channel(s) 28, which then themselves heat(s) the preform 200.

The curing mold 10 may also comprise a press 30 designed to compress the first and second bodies 11, 12 against each other along the clamping direction DS, when the first and second bodies 11, 12 are fitted together (FIG. 2). The press 30 thus clamps the first and second bodies 11, 12 of the curing mold 10 against each other, and resists expansion of the preform 200. The press 30 also assures contact between the peripheral areas 15, 16 of the internal surfaces 13, 14 of the first and second bodies 11, 12 of the curing mold 10 and thus prevents resin leaks.

Figure 5:
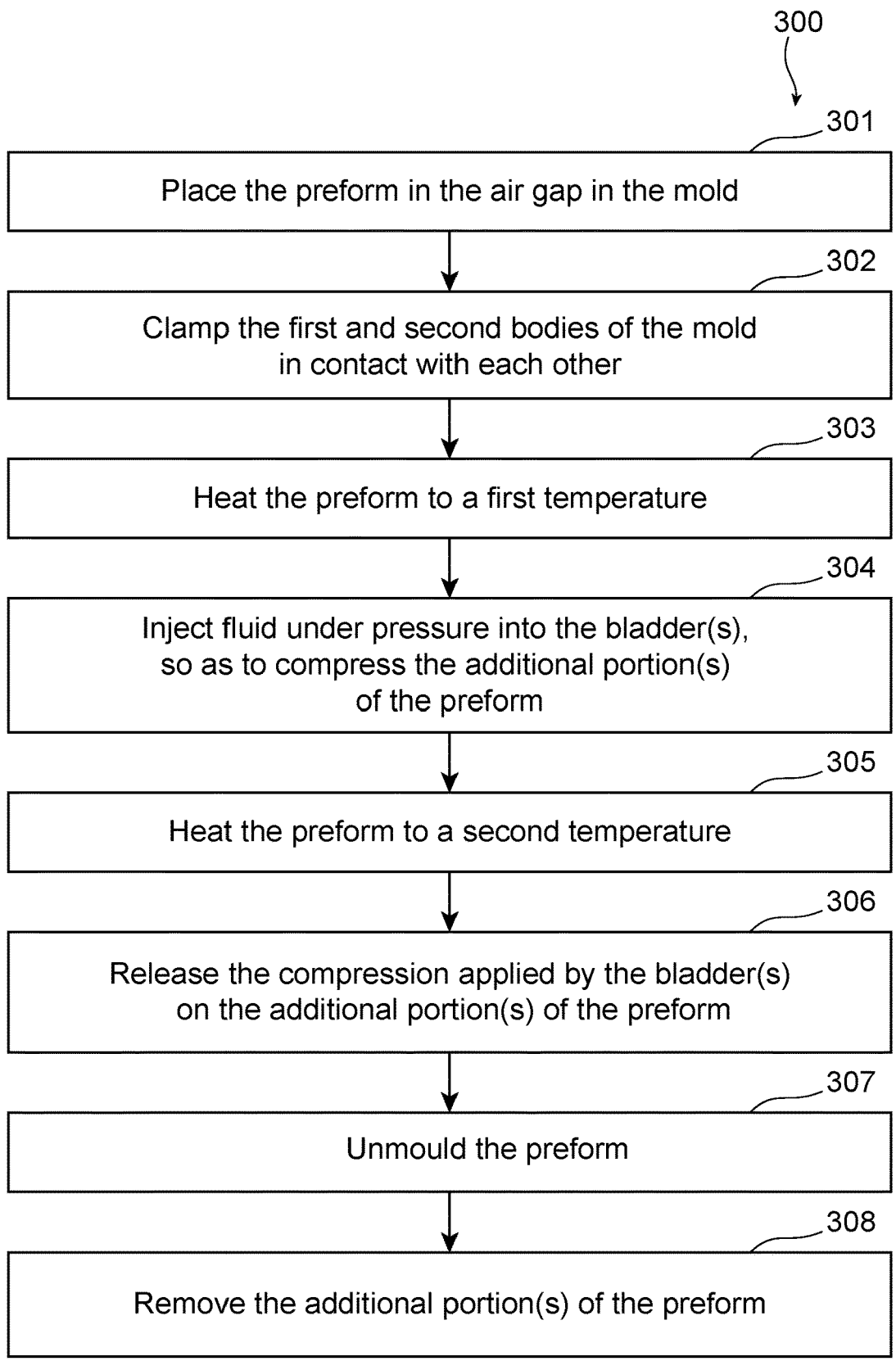
FIG. 5 is a flow chart of a method for manufacturing a turbomachine component made of composite material using the curing mold illustrated in FIGS. 1 to 4.

FIG. 5 illustrates a method 300 for manufacturing a turbomachine component made of a composite material using the curing mold 10. The manufacturing method 300 includes the following steps:

place 301 the preform 200 in the air gap 19, between the first and second bodies 11, 12 of the curing mold 10, the portion to be molded 201 of the preform 200 being located in the molding part 20 of the air gap 19, an additional portion 202 of the preform 200 being located in the or in each additional part 21 of the air gap 19;

if applicable, clamp 302 the first and second bodies 11, 12 of the curing mold 10 together along the clamping direction DS;

heat 303 the preform 200 to the first temperature;

inject 304 the pressurized fluid into the or into each bladder 23, so that the or each of the bladders 23 inflates to the inflated state and compresses the additional portion 202 of the preform 200 located in the additional part 21 of the air gap 19 facing said bladder 23, the preform 200 being held at the first temperature.

For example, a hydrostatic pressure of between 3 and 10 bar inclusive, preferably between 3 and 7 bar inclusive, is applied to the preform 200.

The manufacturing method 300 may also include the following steps:

heat 305 the preform 200 to the second temperature, so as to cure the preform 200, the compression applied by the bladder(s) 23 in the inflated state on the additional portion(s) 202 of the preform 200 being maintained;

release 306 the compression applied by the bladder(s) 23 on the additional portion(s) 202 of the preform 200 thus cured;

unmould 307 the preform 200 thus cured;

remove 308 the additional portion(s) 202 of the preform 200 thus cured and demoulded, particularly by machining, so as to obtain the turbomachine component;

For example, the step to release 306 occurs as soon as the resin in the preform 200 solidifies in the curing mold 10.

Figure 6:
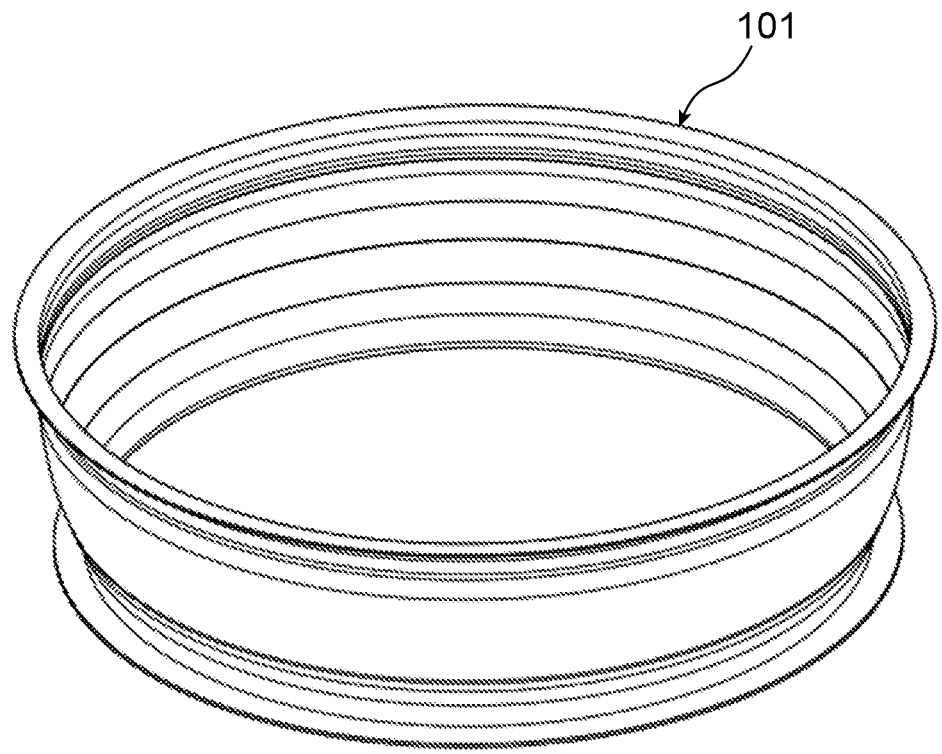
FIG. 6 is a perspective view of an example of a turbomachine component obtained using the manufacturing method illustrated in FIG. 5.
Figure 7:
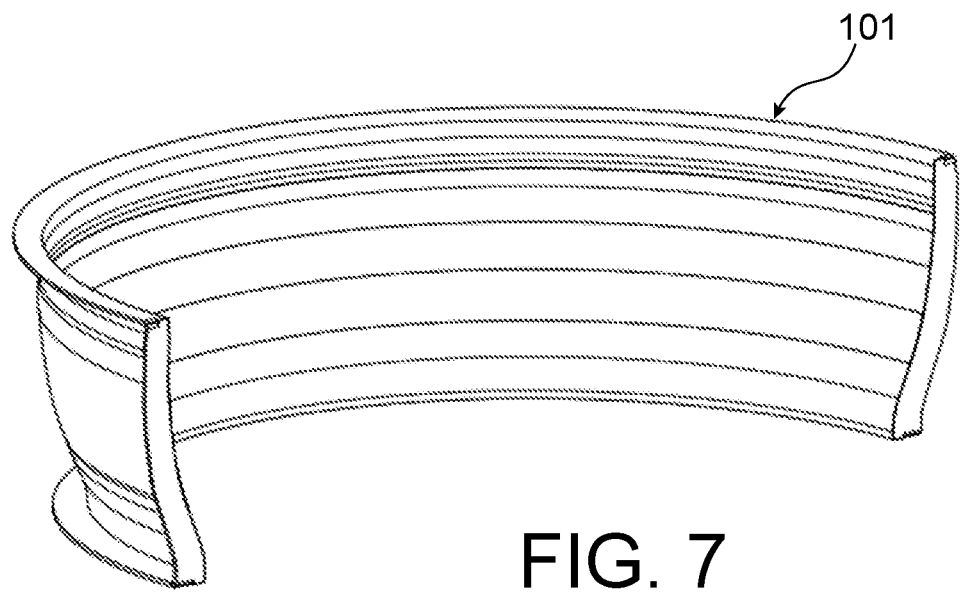
FIG. 7 is a perspective view of another example of a turbomachine component obtained using the manufacturing method illustrated in FIG. 5.
Figure 8:
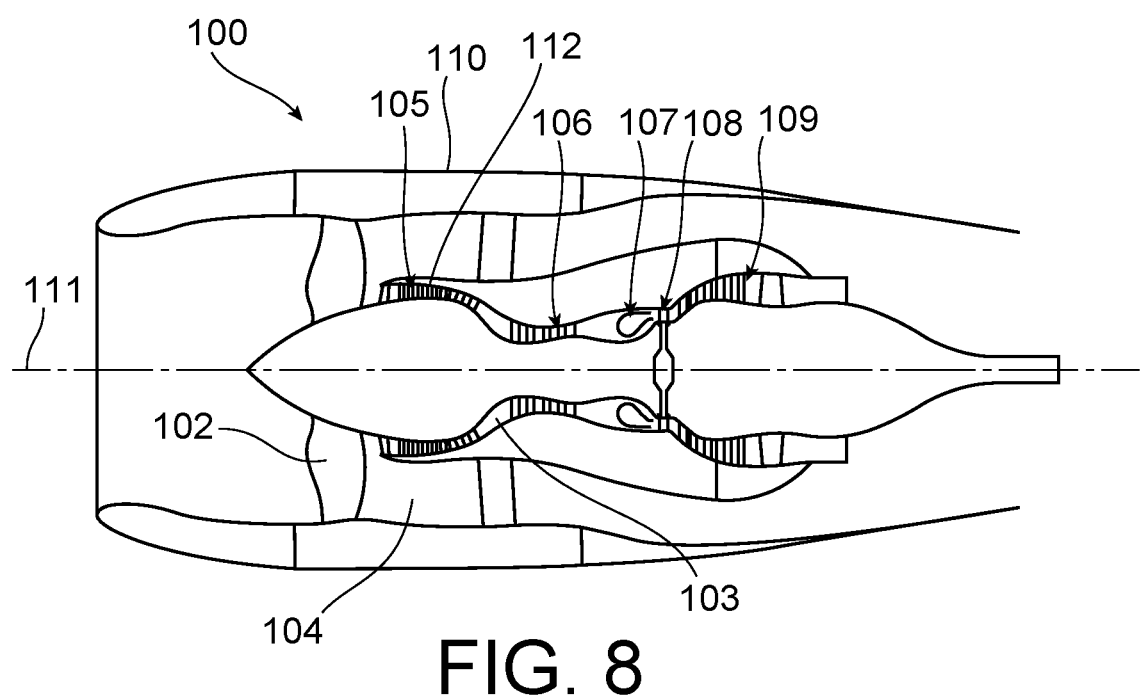
FIG. 8 is a longitudinal, diagrammatic sectional view of a turbomachine for an aircraft comprising the turbomachine component illustrated in FIG. 6.

FIGS. 6 and 7 each show an example of a turbomachine component 101 made of composite material obtained by use of manufacturing method 300. FIG. 8 shows a turbomachine 100 for an aircraft comprising the turbomachine component 101.

The turbomachine 100 is a twin spool turbomachine. It comprises a fan 102 for suction of an air stream that is divided downstream from the fan 102 into a core flow circulating in a core flow channel called the core flow stream 103, inside a core of the turbomachine 100, and a bypass flow going around this core in a bypass flow channel, called the bypass flow stream 104.

The core of the turbomachine 100 comprises, in order along the air flow direction from upstream to downstream, a low pressure compressor 105 also called a booster, a high pressure compressor 106, a combustion chamber 107, a high pressure turbine 108 and a low pressure turbine 109.

The rotors of the high-pressure compressor 106 and the high-pressure turbine 108 are connected by a shaft called the "high-pressure shaft", while the rotors of the low pressure compressor 105 and the low pressure turbine 109 are connected by a shaft called the "low pressure shaft" surrounded by the high pressure shaft.

The turbomachine 100 is clad by a nacelle 110 surrounding the bypass flow stream 104.

In addition, the rotors of the turbomachine 100 are mounted rotating around a longitudinal direction 111 of the turbomachine 100.

The low-pressure compressor 105 comprises one or more stators in addition to one or more rotors, arranged alternately with the rotors along the longitudinal direction 111.

The stators include blades extending radially from a longitudinal direction 111 between an inner shell and an outer shell (not shown) on which said blades are carried by an outer casing 112.

For example, the turbomachine component 101 forms the outer casing 112 of the low-pressure compressor 105 (FIG. 6). The turbomachine component 101 can also form a sector of the outer casing 112 of the low-pressure compressor 105 (FIG. 7). "Sector" means an angular sector of the outer casing around the longitudinal direction 111. Alternatively (not shown), the turbomachine component 101 forms a rotor drum.

What is claimed is:

1. Curing mold for manufacturing a turbomachine component made of a composite material, starting from a preform made by laying up prepregs comprising reinforcing fibers impregnated in a thermosetting resin, the preform having a portion to be molded and at least one additional portion extending into the prolongation of the portion to be molded and forming an edge of the preform, the curing mold comprising:

a first body and a second body designed to be fitted together, the first and second bodies each comprising an internal surface itself comprising a peripheral area at which the first and second bodies are in contact with each other and a central area defining a fixed air gap between the first and second bodies, the air gap adapted to accommodate the preform and itself comprising:

a molding part with a shape complementary to the component to be manufactured, the molding part adapted to accommodate the portion to be molded of the preform, and at least one additional part located in a peripheral space of the air gap, the or each additional part adapted to accommodate an additional portion of the preform;

a heating member designed to heat the preform in the air gap to a first temperature, so as to reduce the viscosity of the resin;

at least one inflatable bladder housed in at least one groove in the central area of the internal surface of the first or second body, facing an additional part of the air gap;

an injection member designed to inject fluid under pressure inside the bladder(s), so as to inflate the bladder(s) from a deflated state to an inflated state, and the or each bladder also being designed so that, in the inflated state, it compresses the additional portion of the preform located in the additional part of the air gap facing said bladder, so as to flush the resin from the additional portion of the preform towards the portion to be molded of the preform and thus put the preform under hydrostatic pressure, when the preform is located in the air gap and the heating member heats the preform to the first temperature, wherein the or each additional part extends in a direction of prolongation of the molding part, and wherein the air gap is rectangular.

2. Curing mold according to claim 1, wherein the injection member comprises a compressor designed to pressurize the fluid to be injected into the or each bladder and an injection conduit in communication, on the one hand, with the compressor and on the other hand, with the or each bladder, via one or more channels formed in the first and/or second body.

3. Curing mold according to claim 1, wherein the fluid injected into the or each bladder is a heat transporting fluid and wherein the injection member comprises a heat exchanger designed to heat the heat transporting fluid to be injected into the or each bladder.

4. Curing mold according to claim 1, wherein the heating member is designed to heat the preform to a second temperature, higher than the first temperature so as to cure the preform and wherein the or each bladder is designed so that, in the inflated state, the compression exerted on the additional portion of the preform located in the additional part of the air gap facing said bladder is maintained when the preform is located in the air gap and the heating member heats the preform to the second temperature.

5. Method for using the curing mold of claim 1 to manufacture a turbomachine component made of composite material, starting from a preform made by laying up prepregs comprising reinforcing fibers impregnated in a thermosetting resin, the preform having a portion to be molded and at least one additional portion extending into the prolongation of the portion to be molded and forming an edge of the preform, the manufacturing method comprising the following steps:
place the preform in the air gap, between the first and second bodies of the curing mold, the portion to be molded of the preform being located in the molding part of the air gap, an additional portion of the preform being located in the or in each additional part of the air gap;
heat the preform to the first temperature;
inject pressurized fluid into the or each bladder, so that the or each bladder is inflated to the inflated state and compresses the additional portion of the preform located in the additional part of the air gap facing said bladder, the preform being maintained at the first temperature, the or each bladder flushing resin from the additional portion of the preform to the portion to be molded of the preform, thus putting the preform under hydrostatic pressure.

6. Manufacturing method according to claim 5, comprising the subsequent step to heat the preform to a second temperature, higher than the first temperature, so as to cure the preform, the compression applied by the bladder(s) in the inflated state on the additional portion(s) of the preform being maintained.

7. Manufacturing method according to claim 6, comprising subsequent steps to:
release the compression applied by the bladder(s) on the additional portion(s) of the preform thus cured;
unmould the preform thus cured;
remove the additional portion(s) of the preform thus cured and demoulded, so as to obtain the turbomachine component.

8. Manufacturing method according to claim 5, wherein the preform is put under a hydrostatic pressure between 3 and 10 bar inclusive, during the step to inject pressurized fluid into the or each bladder.

9. Manufacturing method according to claim 5, wherein the preform is put under a hydrostatic pressure between 3 and 7 bar inclusive, during the step to inject pressurized fluid into the or each bladder.

10. Manufacturing method according to claim 5, wherein:
the reinforcing fibers of the preform are oriented perpendicular to a stacking direction;
the bladder(s) is located in the central area of the internal surface of the first or second body, in alignment with the additional portion of the preform along the stacking direction of said additional portion, when the preform is located in the air gap of the curing mold.

11. Manufacturing method according to claim 5, wherein the fluid injected into the or each bladder is a heat transporting fluid and wherein the injection member comprises a heat exchanger designed to heat the heat transporting fluid to be injected into the or each bladder.

* * * * *